United States Patent [19]

Merino

[11] Patent Number: 5,322,036

[45] Date of Patent: Jun. 21, 1994

[54] PET TOY

[76] Inventor: Dennis Merino, 2873 King Edward Dr., El Dorado Hills, Calif. 95762

[21] Appl. No.: 69,919

[22] Filed: Jun. 1, 1993

[51] Int. Cl.⁵ ...................... A01K 15/02; A63H 13/18
[52] U.S. Cl. .................................. 119/707; 446/325; 446/268; 446/391
[58] Field of Search ............... 446/325, 326, 396, 391, 446/486, 373, 370; 119/29, 29.5, 707–711

[56] References Cited

U.S. PATENT DOCUMENTS

| | | | |
|---|---|---|---|
| 2,833,244 | 5/1958 | Bohlman | 119/29 |
| 3,097,626 | 7/1963 | Felten | 119/29 |
| 3,252,242 | 5/1966 | Zalkind | 446/325 |
| 3,516,193 | 6/1970 | Engelman | 446/486 |
| 4,756,529 | 7/1988 | Stillinger | 446/268 X |
| 4,787,875 | 11/1988 | Baron et al. | 446/325 X |

FOREIGN PATENT DOCUMENTS 338404  5/1904  France ................ 446/325

*Primary Examiner*—Mickey Yu
*Attorney, Agent, or Firm*—Poms, Smith, Lande & Rose

[57] ABSTRACT

A novelty pet toy which can be set up with either a stationary base or a rocking base. The toy has a resiliently mounted cartoon character which oscillates back and forth when touched. Thus, a pet, such as a cat, can touch the character which oscillates on its resilient mount providing recreation and exercise for the pet. The base may be hollow and filled with any suitable material, such as cat litter.

12 Claims, 2 Drawing Sheets

PET TOY

BACKGROUND OF THE INVENTION

1. Field of the Invention

The invention related to pet toys; and, more particularly, to an oscillating cartoon character resiliently mounted to a base which base can either rock or be stationary.

2. Description of the Prior Art

Various types of toys are known for providing amusement, exercise and recreation for pets. Since many pets are kept inside one's house or apartment or the like for long periods of time, it is necessary to provide entertainment and exercise for the pet or the pet will soon become bored and destroy items in the house or apartment.

Such toys can be used by the pet without distracting the pet's owner. However, sometimes it is desirable to reduce the distraction provided by such a toy. For example, in a first mode of operation, the toy may give substantially more action than in another mode of operation. There is thus a need for allowing such a toy to be used in either mode of operation and adapting the same in a quick and efficient manner.

SUMMARY OF THE INVENTION

It is an object of this invention to provide a novelty pet toy which can be either stationary or rock on a base.

If is a further object of this invention to carry out the foregoing object where the toy has a resiliently mounted cartoon character pleasing to humans and pets which oscillates when touched.

It is still further on object of this invention to carry out the foregoing objects wherein the base may be hollow and filled with a suitable material, such as cat litter, by the pet's owner.

These and other objects are preferably accomplished by providing a novelty pet toy which can be set up with either a stationary base or rocking base. The toy has a resiliently mounted cartoon character which oscillates back and forth when touched. Thus, a pet, such as a cat, can touch the character which oscillates on its resilient mount providing recreation and exercise for the pet. The base may be hollow and filled with any suitable material, such as cat litter.

DESCRIPTION OF THE PREFERRED EMBODIMENT

Figure 1:
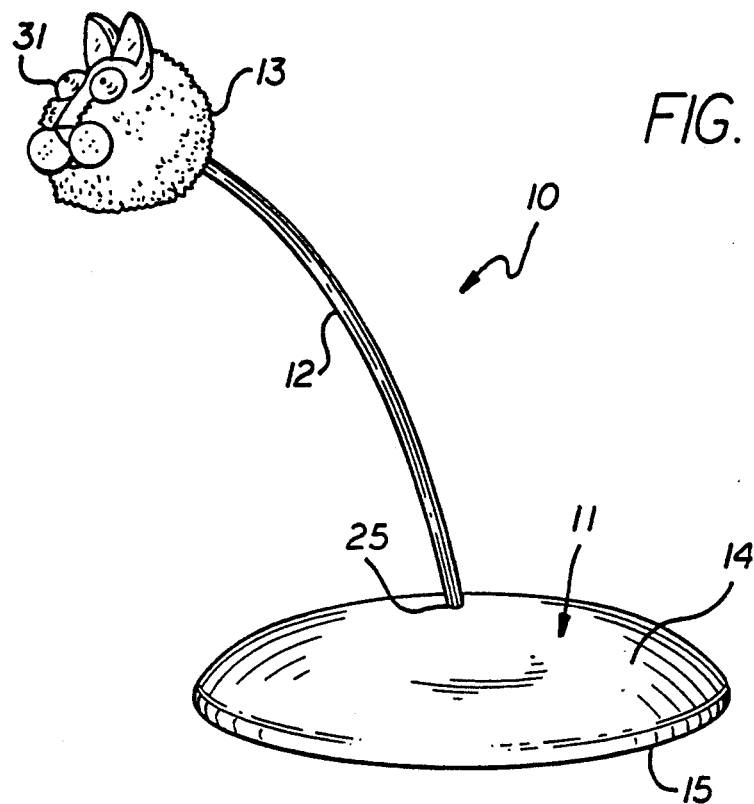
FIG. 1 is a perspective view of a novelty pet toy in accordance with the teachings of the invention.

Referring now to FIG. 1 of the drawing, a novelty pet toy 10 is shown comprising a base 11, an elongated resilient member 12 connected to the base and a cartoon character 13 mounted on the resilient member.

Figure 2:
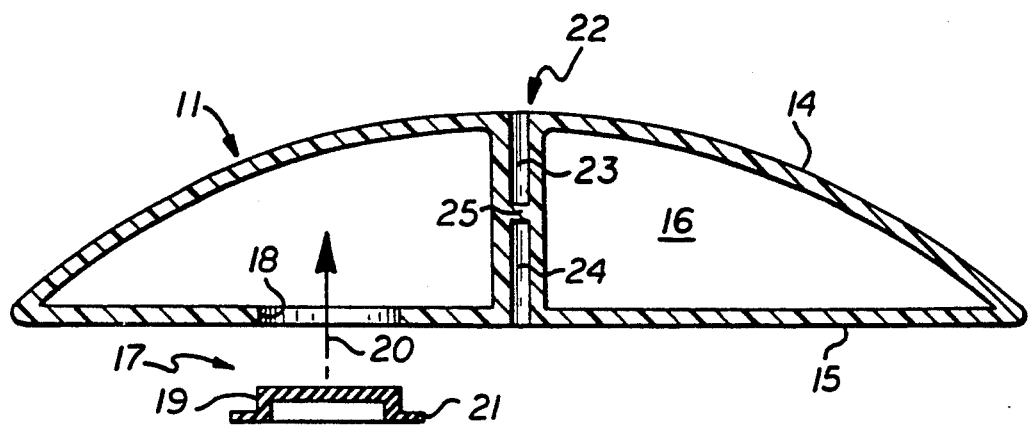
FIG. 2 is a section exploded view of the base alone of the toy of FIG. 1.

As seen in FIG. 2, base 11 has an upper outer arcuate wall 14 and a lower outer bottom wall 15, the interior 16 of base 11 being hollow and normally closed off by a cap 17 adapted to be press-fit into an opening 18 in bottom wall 15 as indicated by arrow 20. Cap 17 thus has an inner cylindrical portion 19 of an outer diameter generally related to the inner diameter of opening 18 (which may be round—of course, opening 18 and portion 19 may be of any suitable similar configurations). An outer circular flange 21 is integral with portion 19 overlying opening 18 and abutting against the wall portion of bottom wall 15 when cap 17 is installed in opening 18. Thus, flange 21 can be used to peel cap 17 out of opening 18.

Thus, base 11 can be shipped empty, turned upside down, and filled with any suitable ballast material through opening 18, such as kitty litter.

Base 11 also has a centrally mounted resilient member securement means 22 in the preferred form of a double recess accessible from both sides of base 11.

Thus, as seen in FIG. 2, such means 22 includes a first recess or hole 23 accessible from the curved side 14 of base 11 and a second recess or hole 24 accessible from the flat side 15 of base 11. A wall 25 may separate holes 23 and 24.

Figure 3:
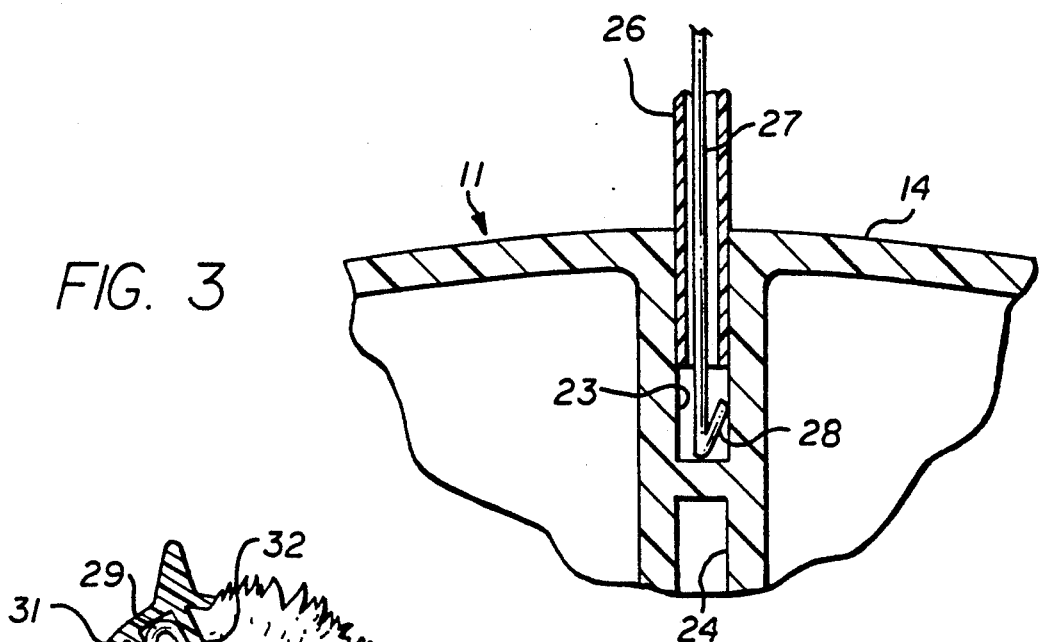
FIG. 3 is a sectional view of a portion of the base of the toy of FIGS. 1 and 2 illustrating insertion of the resilient member of the toy therein.

As seen in FIG. 3, resilient member 12 is preferably an outer elongated hollow tube 26 having a resilient wire 27 disposed therein. Wire 27 extends a short distance out of tube 26 and terminates in a curved or V-shaped end 28. Preferably, tube 26 is of a suitable polyethylene material whereas wire 27 is of any suitable resilient wire material. Base 11, as seen in FIG. 2, may be blow molded from any suitable plastic material.

Thus, when end 28 is inserted into hole 23, as seen in FIG. 1, end 28 acts as a barb on a fish hook and holds member 12 to base 11 due to the resiliency of the parts. Tube 26, as seen in FIG. 3, has an outer diameter generally related to the inner diameter of hole 23 and is pushed down a short distance into hole 23.

Thus, in the position shown in FIG. 3 (see also FIG. 1), the base 11 remains stationary while resilient member 12 can oscillate about base 11.

Figure 4:
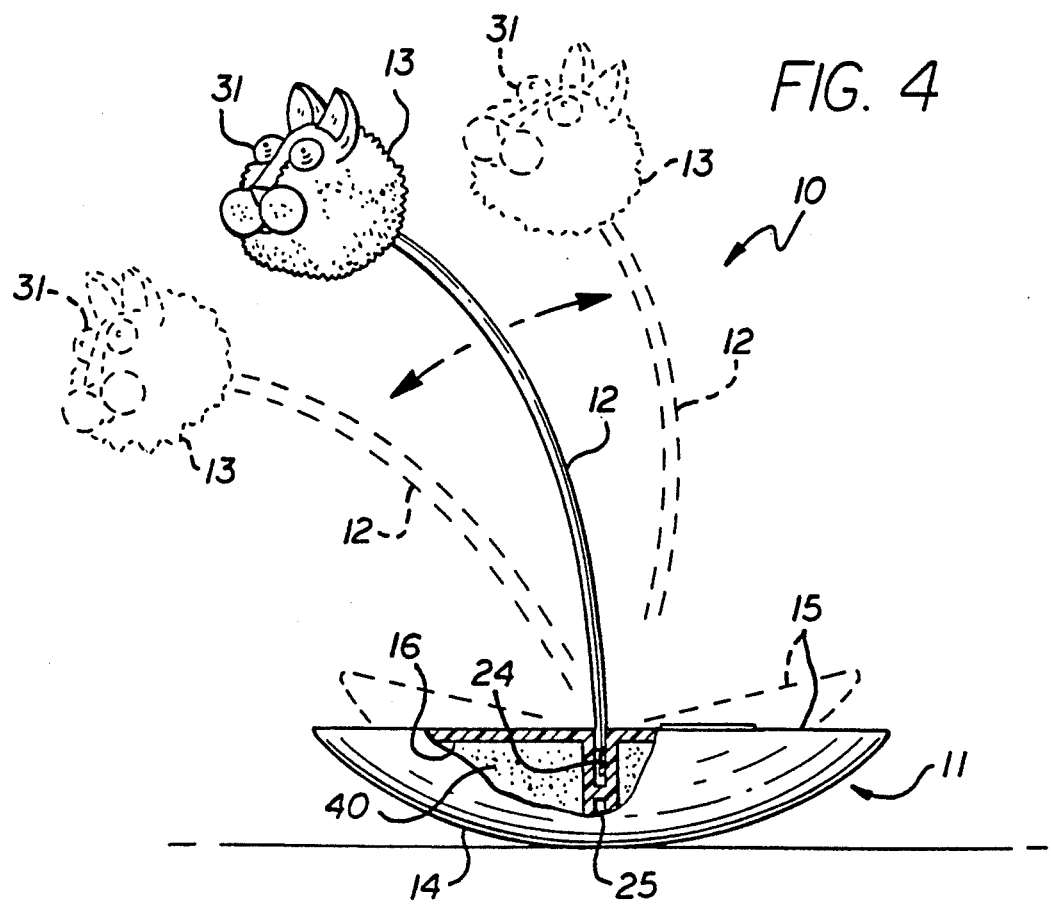
FIG. 4 is a view similar to FIG. 1 showing the resilient member mounted in the hole on the flat side of the base.

As seen in FIG. 4, resilient member 12 can be mounted in hole 24 on the flat side 15 of the base 11 allowing the toy 10 to rock on curved side 14.

Figure 5:
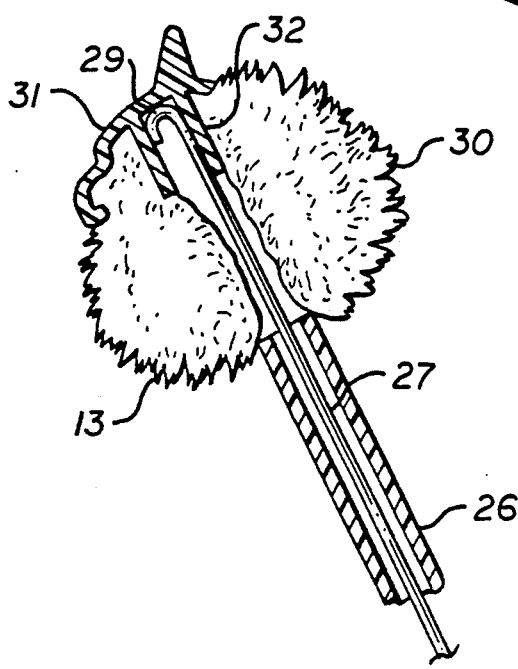
FIG. 5 is a detailed view, partly in section, of a portion of the toy of FIG. 1.

As seen in FIG. 5, wire 27 terminated at its upper end in a hook or curved portion 29 similar to end 28. The cartoon character 13 may have a pompom portion 30 surrounding wire 27 (tube 26 terminating at the entry thereof) integral with a face portion 31. Face portion 31 has a tubular socket 32 on the interior thereof receiving end 29 therein. Face portion 31 may be of a suitable plastic material with socket 32 integral therewith or molded together along with a face portion 31 of any suitable plastic material. Thus, end 29 is press-fit into socket 32 and secures cartoon character 13 thereto.

As seen in FIGS. 1 and 4, the toy 10 can be used by a pet who paws or pushes on either base 11 or character 13. When in the FIG. 1 position, the cartoon character 13 oscillates on resilient member 12 about base 11. When in the FIG. 4 position, the base 11 also rocks imparting added movement and action to the toy.

Although a face of a cartoon character 13 is disclosed, obviously, a variety of configurations can be used, either a complete character face alone, inanimate objects, etc. Normally, one would choose a character or device pleasing to humans and pets.

Pompom 30 can be of a fabric, material, yarn, plastic, etc. and may form part of the character depicted, such as fur. Cap 17 may also be of plastic or any other suitable material, such as rubber.

The hollow base 11 can be shipped empty saving on costs and reducing the weight thereof. The purchaser can fill it with any suitable material such as dirt, sand, oat litter, etc. For example, kitty litter 40 is shown in FIG. 4. Catnip can be associated with toy 10 in any suitable manner, e.g. insertion into base 11, to make it more attractive.

If desired, supporting legs may be molded into base 11 on the flat side thereof. Any suitable dimensions and colors may be used. For example, the wall thickness may be about .030 to .040 inches. The materials used may be high impact styrene or ABS plastic. The face portion 30 (FIG. 1) may have eyes, nose, ears, etc., either molded or drawn thereon.

Wire 27 may be of spring steel about 0.040 inches thick. Tubing 26 may be of polypropolyne. When assembling wire 27 to face portion 31, the wire 27 is preferably fed or fished through pompom 30, end 29 is pressed into socket 32, then tubing 26 is pushed or compressed up against pompom 30 and face portion 31. End 28 is then bent and inserted into a suitable hole 23 of 24 in base 11 as heretofore discussed.

Although a particular embodiment of the invention is disclosed, obviously variations thereof may occur to an artisan and the invention should be limited solely by the scope of the appended claims.

I claim:

1. A novelty pet toy comprising:
   a base having a generally flat bottom wall and a curved top wall, said base also having a first hole extending through said top wall and a second hole extending through said bottom wall;
   a resilient member adapted to oscillate on said base and having a terminal upper end mounted in one of said holes; and
   a character mounted on a terminal upper end of said resilient member, whereby, when said resilient member is mounted in said hole in the bottom wall, said base can rock about said curved top wall, and when said resilient member is mounted in said hole in said curved top wall, said base remains stationary when said character oscillates thereabout.

2. In the toy of claim 1 wherein said holes are centrally mounted in said base, said first hole being generally axially aligned with said second hole.

3. In the toy of claim 1 wherein said resilient member includes a resilient wire having a hook end fixedly mounted in said one of said holes.

4. In the toy of claim 3 including a resilient tube surrounding said wire between said base and said character.

5. In the toy of claim 4 wherein said wire terminates in a second hook end opposite said first mentioned hook end fixedly receivable in a socket in said character.

6. In the toy of claim 1 wherein said resilient member includes a wire having a hook end mounted in a socket in said character.

7. In the toy of claim 6 wherein said character has a face on one side thereof and said socket on the other side thereof.

8. In the toy of claim 7 including a pompom surrounding said resilient member adjacent said face, said wire extending therethrough.

9. In the toy of claim 8 wherein said pompom is of yarn material.

10. In the toy of claim 1 wherein said base is of a molded plastic material, said holes being integrally molded therein, said resilient member having a resilient wire terminating in a hook mounted in one of said holes.

11. In the toy of claim 1 wherein said base is normally hollow on the interior thereof with a normally closed opening leading therein.

12. In the toy of claim 11 wherein said base is filled with kitty litter.

* * * * *